United States Patent

Ishibuchi et al.

(10) Patent No.: US 6,745,807 B2
(45) Date of Patent: Jun. 8, 2004

(54) SYSTEM FOR MANUFACTURING BONDED SHEET MATERIAL

(75) Inventors: Hiroshi Ishibuchi, Hiroshima-ken (JP);
Hideo Okuhara, Hiroshima-ken (JP);
Akihisa Fujita, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 47 days.

(21) Appl. No.: 09/951,522

(22) Filed: Sep. 14, 2001

(65) Prior Publication Data
US 2002/0036047 A1 Mar. 28, 2002

(30) Foreign Application Priority Data
Sep. 22, 2000 (JP) ........................................ 2000-288697

(51) Int. Cl.7 .............................................. B32B 31/00
(52) U.S. Cl. ..................... 156/351; 156/359; 156/361; 156/DIG. 10; 156/DIG. 11
(58) Field of Search ................... 156/64, 351, 359, 156/361; 162/DIG. 10, DIG. 11

(56) References Cited

U.S. PATENT DOCUMENTS

| | | | | |
|---|---|---|---|---|
| 3,498,965 A | | 3/1970 | Paquin et al. ................ | 156/244 |
| 3,801,426 A | * | 4/1974 | Putman et al. ............... | 162/198 |
| 3,829,338 A | * | 8/1974 | Hayasi et al. ................ | 156/64 |
| 5,244,518 A | * | 9/1993 | Krayenhagen et al. ........ | 156/64 |
| 5,527,408 A | * | 6/1996 | Allen .......................... | 156/64 |
| 5,802,736 A | | 9/1998 | Klockenkemper et al. .... | 34/484 |
| 5,894,681 A | * | 4/1999 | Klockenkemper et al. .... | 34/524 |

FOREIGN PATENT DOCUMENTS

| | | | | |
|---|---|---|---|---|
| EP | 0936059 A2 | | 8/1999 | |
| JP | 4-164635 | | 6/1992 | |
| JP | 06071792 A | * | 3/1994 | ................ 156/64 |
| JP | 7-68671 | | 3/1995 | |
| JP | 8-34081 | | 2/1996 | |
| JP | 9-24563 | | 1/1997 | |
| JP | 11-221870 | | 8/1999 | |
| JP | 2000-15723 | | 1/2000 | |

* cited by examiner

Primary Examiner—Richard Crispino
Assistant Examiner—George R. Koch, III
(74) Attorney, Agent, or Firm—Armstrong, Kratz, Quintos, Hanson & Brooks, LLP.

(57) ABSTRACT

A bonded sheet material manufacturing system capable of setting a moisture content of various types of sheet members to be bonded to each other to an optimum value for stably producing a bonded sheet material with less bonding failure and less warp at all times, where the sheet members are heated by individual sheet member heating means and then bonded to each other to produce the bonded sheet material. The system comprises a moisture content detecting means provided for at least one of the sheet members for detecting a moisture content of the sheet member or a parameter correlating with the moisture content and a control unit for controlling the sheet member heating means on the basis of detection information from the moisture content detecting means so that the moisture content approaches a predetermined optimum moisture content.

16 Claims, 6 Drawing Sheets

SYSTEM FOR MANUFACTURING BONDED SHEET MATERIAL

BACKGROUND OF THE INVENTION

1) Field of the Invention

The present invention relates to a system for manufacturing a bonded sheet material.

2) Description of the Related Art

A system for manufacturing a bonded sheet material (corrugated fiberboard material) is made up of a single facer for forming a single faced bonded sheet material by sticking a back linerboard and a wave-shaped corrugated medium together, and a double facer for forming a double faced bonded sheet material by sticking the single faced bonded sheet material and a front linerboard together.

Each of the back linerboard, the corrugated medium, the single faced bonded sheet material and the front linerboard is preheated by a heating means before the bonding in order to adjust moisture (water) content.

So far, the heating quantity of the aforesaid preheating has been set by the perception and experience of an operator on the basis of a feed speed, kind and others of an object to be heated. However, the setting of the heating quantity based on the perception and the experience is unreliable; therefore, difficulty is encountered in stably manufacturing a bonded sheet material with less bonding failure and less warp at all times.

SUMMARY OF THE INVENTION

The present invention has been developed in consideration of such a problem, and it is therefore an object of the present invention to provide a bonded sheet material manufacturing system capable of setting optimum moisture content of sheet members to be bonded to each other to stably manufacture a bonded sheet material with less bonding failure and less warp at all times.

For this purpose, in accordance with the present invention, there is provided a system for manufacturing a bonded sheet material by sticking various types of sheet members together after separately heating the sheet members through the use of individual sheet member heating means, the system comprising moisture content detecting means provided for at least one of the sheet members for detecting moisture content of the sheet member or a parameter correlating with the moisture content, and control means for controlling the sheet member heating means on the basis of detection information from the moisture content detecting means so that the moisture content approaches a predetermined optimum moisture content.

In this case, preferably, the sheet member is any one of a back linerboard, a corrugated medium and a single faced bonded sheet material.

In addition, preferably, the sheet member heating means includes a heating roll for heating the sheet member in a state where the sheet member is wound around its circumferential surface and winding angle adjusting means for adjusting a winding angle of the sheet member with respect to the heating roll, and the control means controls the winding angle adjusting means. In this case, it is also appropriate that the winding angle adjusting means includes a guide roll for bringing the sheet member into contact with the heating roll and guide roll moving means for moving the guide roll on the circumferential surface of the heating roll.

Still additionally, preferably, the sheet member heating means includes a heating roll for heating the sheet member in a state where the sheet member is wound around its circumferential surface and valve means for adjusting a quantity of supply of heating steam to the interior of the heating roll, and the control means controls the valve means.

Moreover, preferably, the control means comprises a first control element for feedback-controlling the sheet member heating means when a deviation between desired moisture content and the moisture content detected by the moisture content detecting means is equal to or below a predetermined value and a second control element for feedforward-controlling the sheet member heating means when the deviation therebetween is more than the predetermined value.

Still moreover, the control means further includes a third control element for controlling the sheet member heating means to heat the sheet member to a preset temperature agreeing with an order change during the order change.

Yet moreover, the control means further includes a fourth control element for, when a feed speed of the sheet member is lower than a predetermined speed, controlling the sheet member heating means to heat the sheet member to a preset temperature agreeing with the lower feed speed than the predetermined speed.

In addition, preferably, a plurality of heating means each equivalent to the sheet member heating means are provided, and when a total heating quantity of the plurality of heating means reaches an excessive value, the control means decreases the heating quantities of the plurality of heating means successively starting from the upstream side heating means.

Still additionally, preferably, a plurality of heating means each equivalent to the sheet member heating means are provided, and when a total heating quantity of the plurality of heating means does not reach a required value, the control means increases the heating quantity of the plurality of heating means successively starting from the downstream side heating means.

Yet additionally, it is also appropriate that a temperature sensor is used as the moisture content detecting means, or that a moisture sensor is used as the moisture content detecting means.

Furthermore, it is also appropriate that the bonded sheet material manufacturing system further comprises scanning means for shifting the moisture content detecting means to scan the sheet member in a width direction of the sheet member and time-averaging means for time-averaging the outputs of the moisture content detecting means scanning-shifted by scanning means.

Still furthermore, it is also appropriate that a plurality of moisture content detecting means each equivalent to the aforesaid moisture content detecting means are located at a predetermined interval in a width direction of the sheet member, and width direction averaging means is further provided to average the outputs of the plurality of moisture content detecting means.

According to this bonded sheet material manufacturing system, the sheet members to be bonded heated by a heating means to optimize their moisture content, thus stably manufacturing a high-quality bonded sheet material with less bonding failure and less warp at all times.

In addition, the optimum moisture content based on a feed speed, a type of sheet member, a basic weight and others can be optimized through the heating by the heating means, which contributes to improvement of operability and manpower-saving.

DESCRIPTION OF THE PREFERRED EMBODIMENTS

Figure 1:
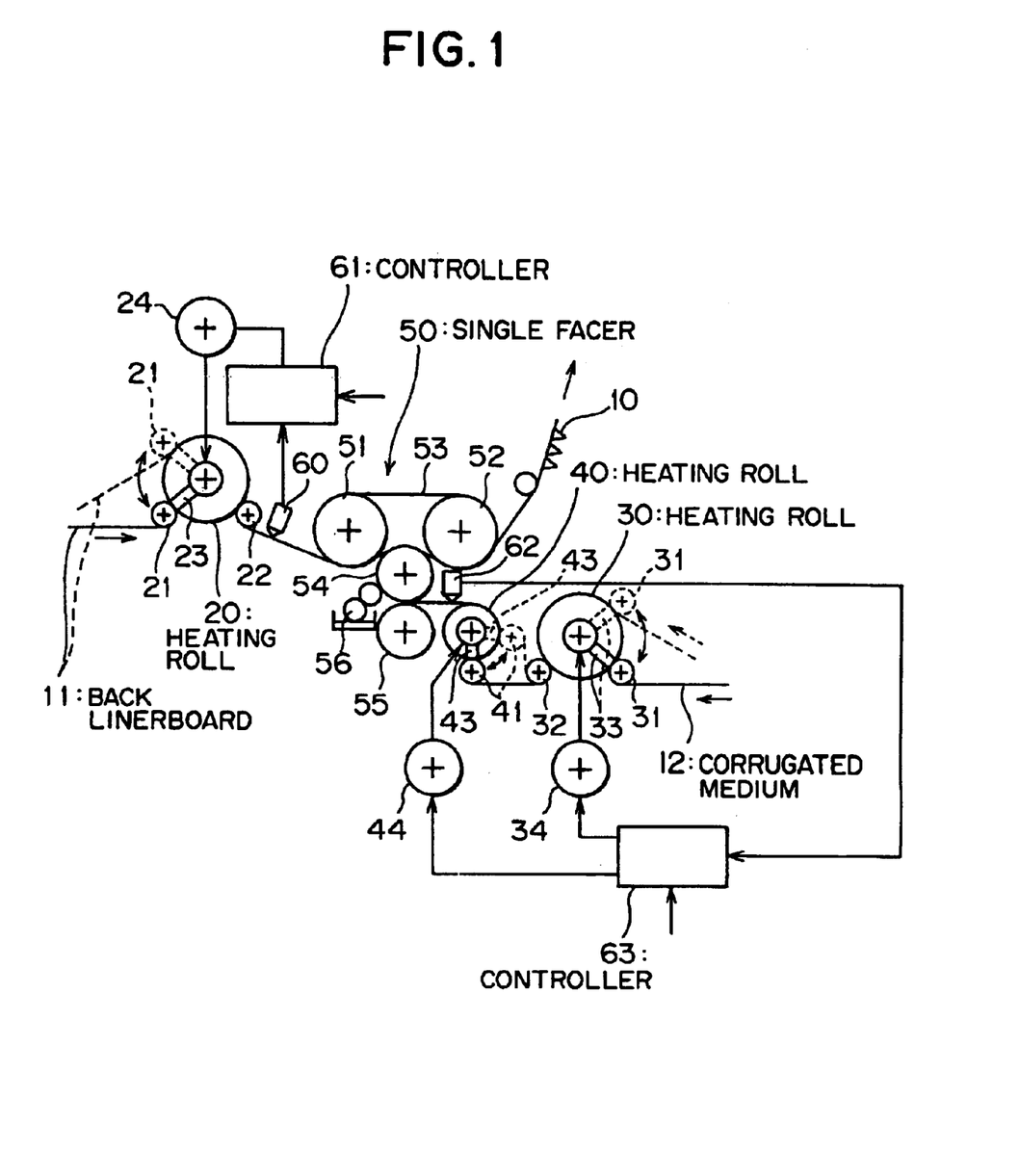
FIG. 1 schematically shows a construction of a heating element in a single facer section of a bonded sheet material manufacturing system according to a first embodiment of the present invention.

Referring to the drawings, a description will be given hereinbelow of a bonded sheet material manufacturing system according to a first embodiment of the present invention. FIG. 1 is a schematic partial illustration of a construction of only a single facer and peripherals thereof, that is, of only a construction for forming a single faced bonded sheet material (single faced corrugated fiberboard material) 10.

This bonded sheet manufacturing system is made up of a heating roll 20 for preheating a back linerboard 11, heating rolls 30 and 40 for preheating a corrugated medium 12, and a belt type single facer 50 for sticking the back linerboard 11 and the corrugated medium 12 together. The back linerboard 11 and the corrugated medium 12 are sheet members to be bonded to each other. Each of the heating rolls 20, 30 and 40 is heated up to a predetermined temperature in a manner that steam is supplied to its interior.

A pair of guide rollers 21 and 22 are brought into contact with a circumferential surface of the heating roll 20. Of these guide rollers 21 and 22, the guide roller 21 positioned on the upstream side is supported by a tip portion of an arm 23 attached to the shaft of the heating roll 20 to be able to rock and is shifted within an angular range, indicated by arrows in the illustration, in accordance with the rocking motion of the arm 23 made by an operation of a motor 24. That is, in connection with the guide roller 21, a guide roller moving means, comprising the arm 23 and the motor 24, is provided for shifting the guide roller 21 on a circumferential surface of the heating roll 20. On the other hand, the guide roller 22 positioned on the downstream side is in a fixed condition.

In connection with the heating roll 30, guide rollers 31 and 32 are provided which correspond to the guide rollers 21 and 22, respectively, and an arm 33 is provided which corresponds to the arm 23, and even a motor 34 is placed which corresponds to the motor 24. Accordingly, the guide roller 31 is shifted within an angular range, indicated by arrows in the illustration, by the rocking motion of the arm 33 caused by an operation of the motor 34. That is, in connection with the guide roller 31, a guide roller moving means, comprising the arm 33 and the motor 34, is provided for shifting the guide roller 31 on a circumferential surface of the heating roll 30.

One guide roller 41 is brought into contact with the heating roll 40. This guide roller 41 is supported by a tip portion of an arm 43 attached to a shaft of the heating roll 40 to be able to rock, and is shifted within an angular range, indicated by arrows in the illustration, by the rocking motion of the arm 43 made in accordance with an operation of a motor 44. That is, as with the case of the guide rollers 21 and 31, a guide roller moving means, comprising the arm 43 and the motor 44, is provided in connection with the guide roller 41.

The single facer 50 is made up of an endless belt 53 stretched between a pair of rolls 51 and 52, an upper roll 54 brought into pressing contact with the belt 53, a lower roll 55 brought into contact with the upper roll 54, and a gluing device 56 placed in the vicinity of the upper roll 54.

In this bonded sheet material manufacturing system, since the back linerboard 11 is moved while being wound around the circumferential surface of the heating roll 20, it is heated by the heating roll 20 during the movement.

Since the back linerboard 11 is wound around the heating roll 20 between the guide rollers 21 and 22, the winding angle of the back linerboard 11 with respect to the heating roll 20 is adjustable in a manner that the motor 24 is operated to change the rocking position of the arm 23. That is, the winding angle is at a maximum when the arm 23 is at a position indicated by a solid line, while it is at a minimum when coming to a position indicated by a dotted line. In addition, since the period of time for which the back linerboard 11 comes into contact with the heating roll 20 is prolonged as the winding angle with respect to the heating roll 20 increases, the heating energy given from the heating roll 20 increases. That is, a winding angle adjusting means comprising the guide rollers 21 and 22 and the guide roller moving means including the arm 23 and the motor 24 is provided for the heating roll 20, and the heating roll 20 and the winding angle adjusting means constitute a heating means for the back linerboard 11.

On the other hand, since the corrugated medium 12 is moved while being wound around the circumferential surfaces of the heating rolls 30 and 40 sequentially, it is heated by these rolls 30 and 40 during the movement. In addition, as the winding angles of the corrugated medium 12 with respect to the heating rolls 30 and 40 become larger, the heating energy given thereto by the heating rolls 30 and 40 increases. That is, a winding angle adjusting means comprising the guide rollers 31 and 32 and the guide roller moving means (the arm 33 and the motor 34) is provided for the heating roll 30, and the heating roll 30 and the winding angle adjusting means constitute a heating means for the corrugated medium 12. Likewise, a winding angle adjusting means comprising the guide roller 41 and the guide roller moving means (the arm 43 and the motor 44) is provided for the heating roll 40, and the heating roll 40 and the winding angle adjusting means organize a heating means for the corrugated medium 12.

The back linerboard 11 heated by the heating roll 20 and the corrugated medium 12 heated by the heating rolls 30 and 40 are conveyed into the single facer 50. At this time, although the corrugated medium 12 arrives at the belt 53 by way of the upper roll 54 and the lower roll 55, a glue is applied to the corrugated medium 12 by the gluing device 56 immediately before the arrival thereat.

The back linerboard 11 and the corrugated medium 12 are pressed by the belt 53 and the upper roll 54, and at this time, they are bonded to each other by means of the glue applied onto the corrugated medium 12. The back linerboard 11 and the corrugated medium 12 bonded to each other is carried as a single faced bonded sheet material 10 to the next process.

Meanwhile, in order to prevent warp or bonding failure of the single faced bonded sheet material 10 manufactured as mentioned above, there is a need to appropriately maintain the moisture contents of the linerboard 11 and/or the corrugated medium 12 before being bonded to each other.

The moisture content of the back linerboard 11 depends upon its temperature, and decreases as the temperature increases. In addition, the correspondence between the moisture content and the temperature can be proved previously through experiments, simulations or the like. This is also valid for the corrugated medium 12.

The temperature (moisture content) of the back linerboard 11 varies in accordance with the winding angle thereof with respect to the heating roll 20, and likewise, the temperature (moisture content) of the corrugated medium 12 varies with the winding angle thereof with respect to the heating rolls 30 and 40.

Therefore, according to this embodiment, the temperature of the heated back linerboard 11 carried from the heating roll 20 is used as a parameter correlating with the moisture content, and is detected by a temperature sensor (moisture content detecting means) 60 placed at a position immediately before the single facer 50, while the winding angle adjusting means is controlled on the basis of the detection temperature in a controller (control means) 61 to control the winding angle of the back linerboard 11 with respect to the heating roll 20 so that the temperature of the back linerboard 11 becomes an optimum temperature corresponding to optimum moisture content.

The controller 61 is for controlling an operation of the winding angle adjusting means (heating means) on the basis of the detection result of the temperature sensor 60, and includes a control element for performing feedback control, a control element for executing feed forward control and a control element for implementing preset control.

Figure 2:
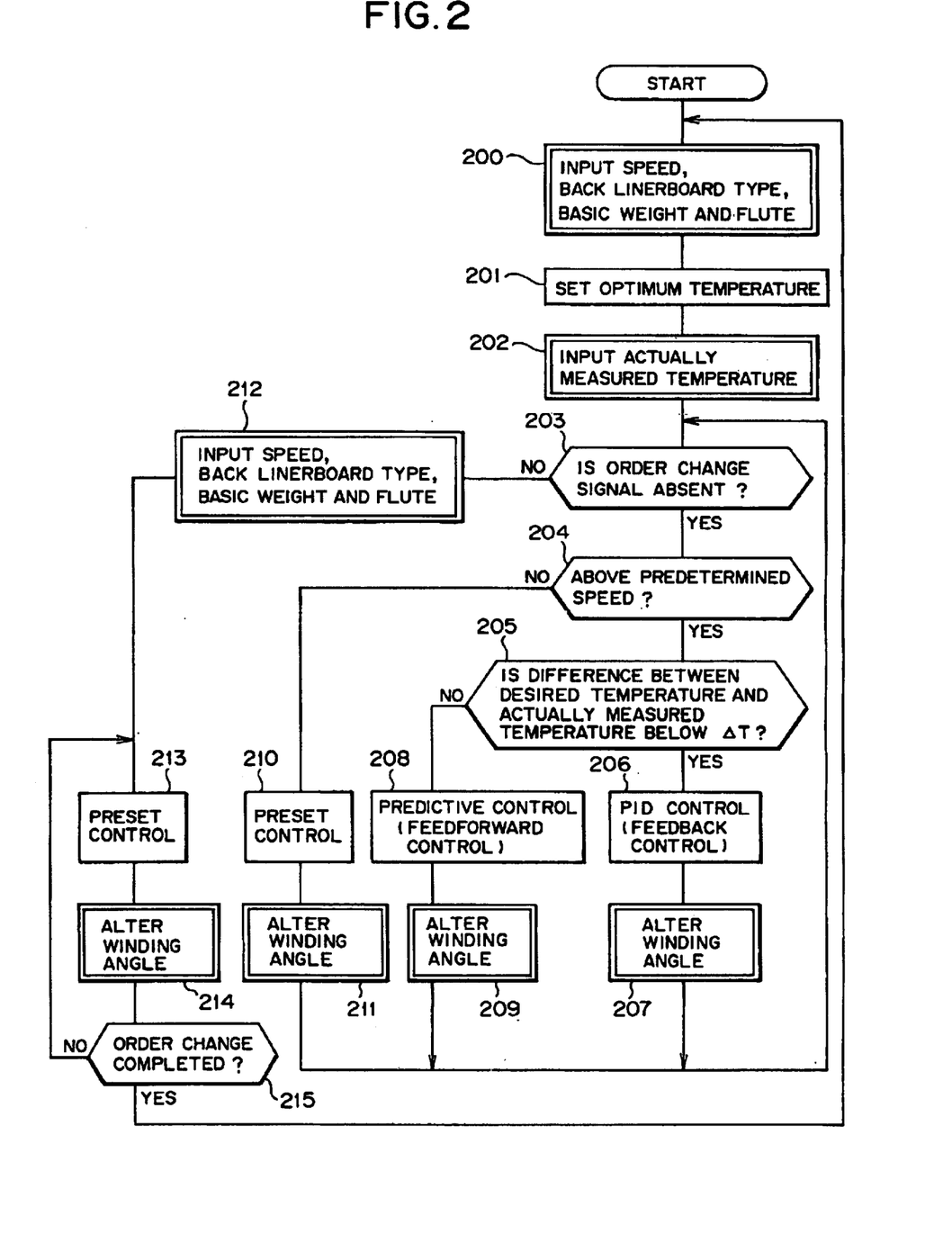
FIG. 2 is a flowchart showing one example of a heating temperature control procedure in the bonded sheet material manufacturing system according to the first embodiment of the invention.

FIG. 2 is an illustration of an example of such a winding angle control procedure to be implemented in the controller 61. A description will be given hereinbelow of this procedure.

[Step 200]

This procedure starts at a step 200 to input, from a host managing unit (not shown), information representative of a feed speed, back linerboard type and basic weight (weight of fiberboard per square meter) of the back linerboard 11 and a flute of the corrugated medium 12.

[Step 201]

At a step 201, an optimum temperature of the back linerboard 11 is set on the basis of the information inputted in the step 200. This optimum temperature is a temperature which does not cause the bonding failure of the back linerboard 11 or the warp of the single faced bonded sheet material 10, and is establishable in advance through experiments, simulations or the like.

The controller 61 previously puts an optimum temperature, corresponding to each of the foregoing information, as a desired temperature in a memory (not shown), and sets a corresponding desired temperature on the basis of the information inputted and the contents stored in the memory.

[Step 202]

At a step 202, an actually measured temperature of the back linerboard 11 is detected by the temperature sensor 60 and taken. In this embodiment, a plurality of the temperature sensors 60 are placed in a width direction (direction perpendicular to the paper surface of FIG. 1) of the back linerboard 11 so that the average value of the temperatures detected by these temperature sensors 60 is used as the actually measured temperature value of the back linerboard 11.

It goes without saying that it is also appropriate that one temperature sensor 61 is shifted to scan the back linerboard 11 in its width direction so that a time average value of the temperatures detected in this way is used as the actually measured temperature value of the back linerboard 11.

[Step 203]

At a step 203, a decision is made as to whether or not an order change signal is outputted from the managing unit. This order change signal is issued in the case of formation of a double faced bonded sheet material according to a different specification, and at this time the alteration of the feed speed, back linerboard type and others takes place.

[Step 204]

In the case of no issue of the order change signal, at a step 204, a decision is made as to whether or not the feed speed of the back linerboard 11 exceeds a predetermined speed.

[Step 205]

When the back linerboard 11 runs at a speed higher than the predetermined speed, at a step 205, a decision is made as to whether or not the deviation between the aforesaid desired temperature and the actually measured temperature is below ΔT.

[Steps 206 and 207]

When the deviation therebetween is equal to or below ΔT, at steps 206 and 207, the motor 24 is feedback-controlled so that the actually measured temperature equals the desired temperature. That is, the winding angle of the back linerboard 11 with respect to the heating roll 20 is feedback-controlled with the PID compensation. Thereafter, the operational flow returns to the step 203.

[Steps 208 and 209]

When the deviation therebetween exceeds ΔT, at steps 208 and 209, the feedforward control is implemented in order to eliminate this temperature deviation.

Figure 3:
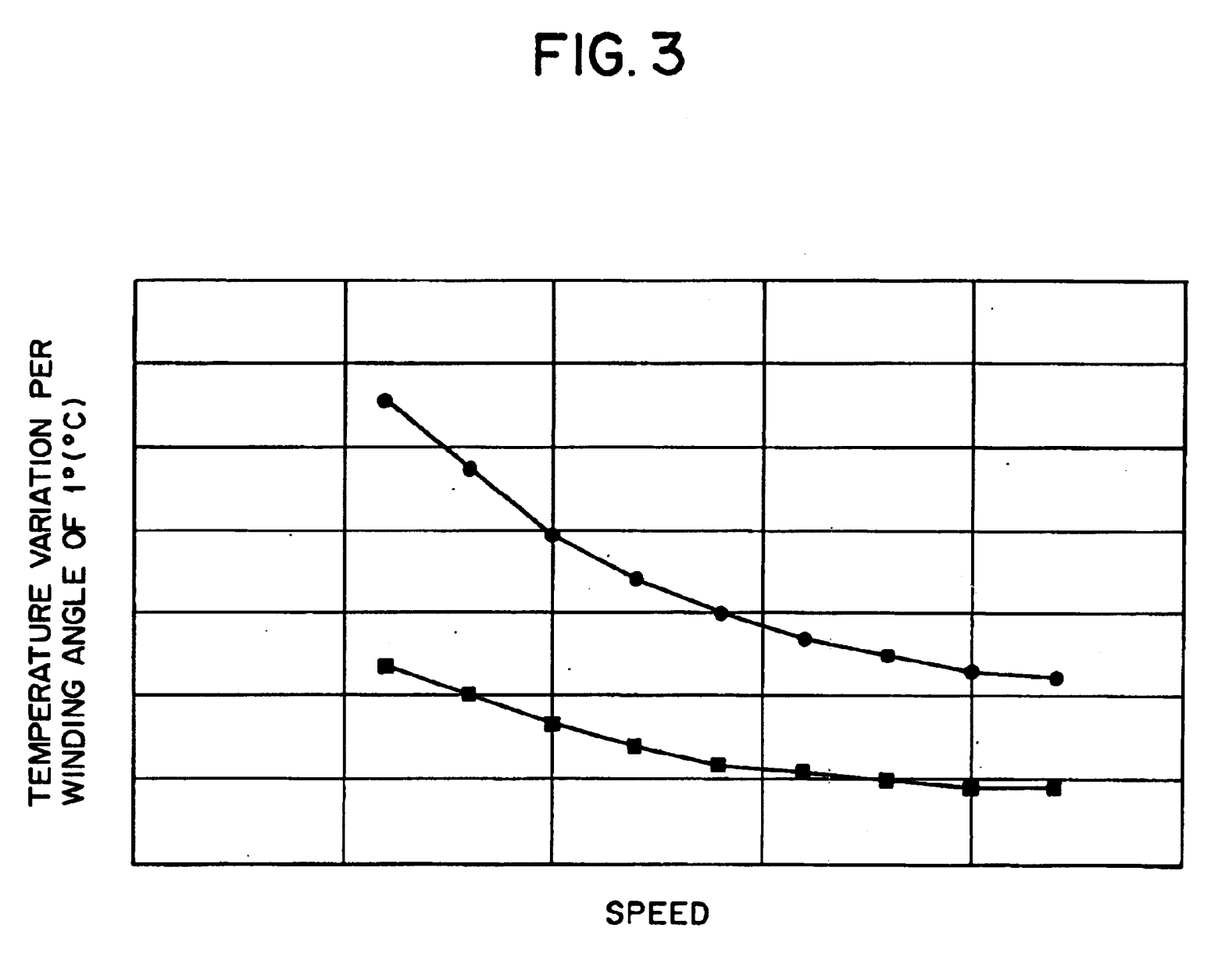
FIG. 3 is a graphic illustration of the relationship between a sheet member feed speed and a temperature variation of a sheet member per winding angle of 1° in the bonded sheet material manufacturing system according to the first embodiment of the invention.

The relationship between the feed speed of the back linerboard 11 and the temperature variation per winding angle of 1° in the back linerboard 11 is obtainable through simulations or actual measurements, and is exemplified in FIG. 3. In this illustration, a characteristic plotted with black circles shows a case in which the basic weight M is equal to or below 245 g/square meter (M≦245 g/square meter), while a characteristic plotted with black squares indicates a case in which the basic weight M exceeds 245 g/square meter (M>245 g/square meter).

A required alteration quantity of the winding angle for decreasing the aforesaid temperature deviation promptly is found from the relationship shown in FIG. 3, and the motor 24 is controlled so that the winding angle varies by that alteration quantity. The aforesaid feedforward control signifies this control.

The aforesaid relationship is valid for one back linerboard type and one flute. Accordingly, in the case of employment of a different back linerboard type and a different flute, the relationship between feed speed and the winding angle in this case is also set previously through actual measurements or the like, and is also stored previously in the memory (not shown).

After the implementation of this feedforward control, the operational flow returns to the step 203.

[Steps 210 and 211]

When the feed speed of the back linerboard 11 is lower than a predetermined speed (for example, 200 feet/min), the time of heating to the back linerboard 11 by the heating roll 20 becomes longer. In this case, in the aforesaid feedback control or feedforward control, there is a possibility that the temperature control accuracy of the back linerboard 1 lowers because of excessive control or the like.

For this reason, at steps 210 and 211, preset control is implemented on the temperature (winding angle) of the back linerboard 11. In this case, a desired winding angle is preset on the basis of the simulation results, experiments or the like, and the motor 24 is controlled to realize this desired winding angle. To increase the control speed, this desired winding angle is set so that a controlled variable becomes higher than that in the feedforward control. The desired winding angle is naturally preset in consideration of back linerboard type, basic weight and flute.

After the implementation of the preset control, the operational flow returns to the step 203.

[Step 212]

The order change requires alteration of some or all of the feed speed, back linerboard type, basic weight and flute of the back linerboard 11. Accordingly, at a step 212, the aforesaid information is again inputted at an input of an order change signal.

[Steps 213 and 214]

At steps 213 and 214, the temperature (winding angle) of the back linerboard 11 is preset-controlled. In this case, a plurality of desired winding angles corresponding to feed speeds, back linerboard types, basic weights and flutes are preset on the basis of simulations, experiments. In addition, a desired winding angle agreeing with the speed, back linerboard type, basic weight and flute inputted in the step 212 is selected from these desired winding angles, and the motor 24 is controlled to realize this desired winding angle.

Incidentally, the temperature of the back linerboard 11 is largely varied at an order change. Accordingly, the aforesaid desired winding angle is properly preset to a value whereby the temperature of the back linerboard 11 rises quickly up to an appropriate temperature.

[Step 215]

At a step 215, on the basis of the aforesaid order change signal, a decision is made as to whether or not the order change comes to an end. If the order change does not terminates yet, the aforesaid preset control continues, and if coming to an end, the operational flow returns to the step 200.

With the above-described procedure, when the aforesaid temperature deviation is more than ΔT, the feedforward control is implemented so that the temperature of the back linerboard 11 approaches a desired temperature promptly, and when the aforesaid temperature deviation is equal to or below ΔT, the feedback control is executed so that the temperature of the back linerboard 11 develops to the desired temperature with high accuracy.

In addition, when the feed speed of the back linerboard 11 is lower than a predetermined speed, the preset control is implemented to provide a stable temperature control result with no hunting, and at an order change, the preset control is executed to change (increase/decrease) the temperature of the back linerboard 11 up to an appropriate temperature promptly; therefore, after the order change, the temperature of the back linerboard 11 can be feedback-controlled or feedforward-controlled smoothly.

In this way, the temperature of the back linerboard 11 before bonding is maintained appropriately at all times, in other words, the moisture content thereof before the bonding is always kept in an appropriate condition, thus preventing the bonding failure stemming from deterioration of the impregnating ability of a glue or the like in the bonding section to the corrugated medium 12, and further preventing the warp of the single faced bonded sheet material 10.

Figure 4:
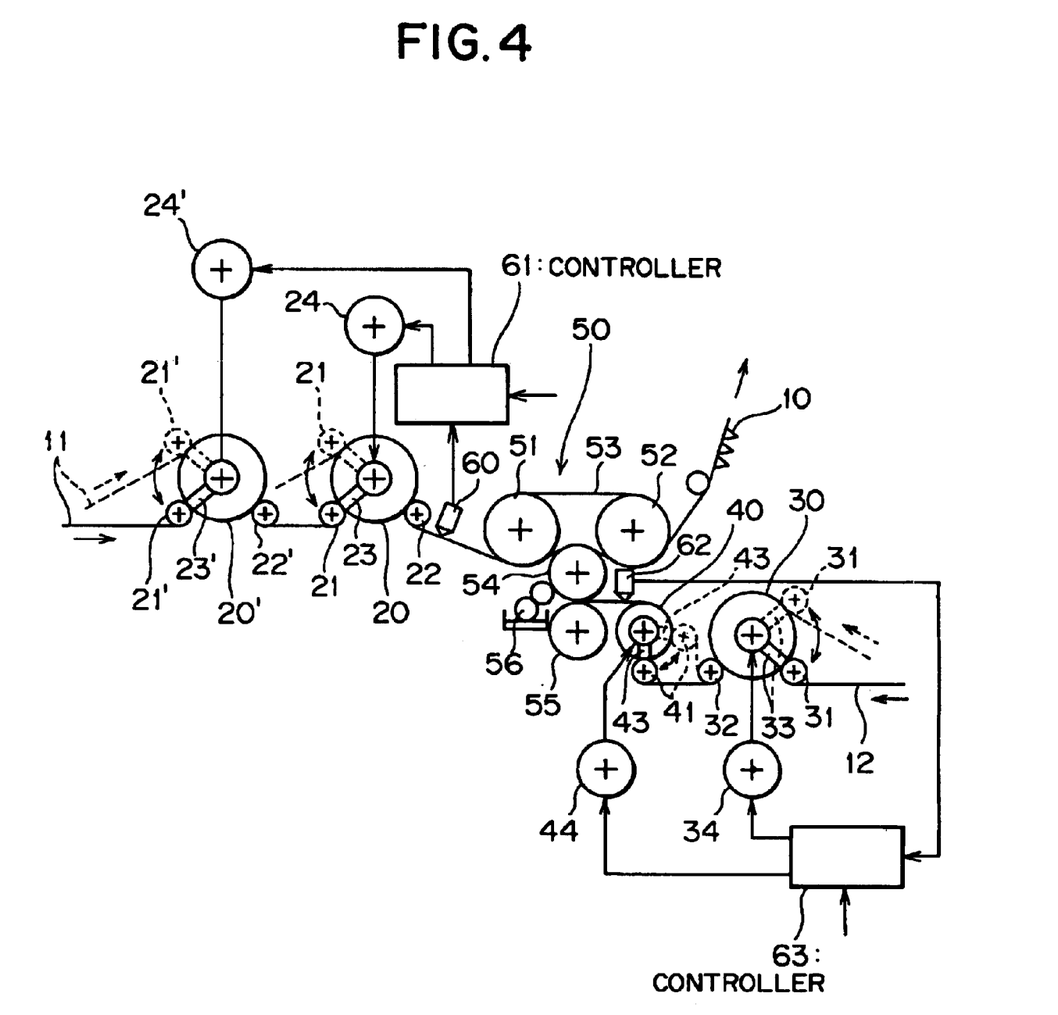
FIG. 4 schematically shows a construction of a heating element of a single facer section of a bonded sheet material manufacturing system according to a second embodiment of the invention.

FIG. 4 is an illustration of a second embodiment of the present invention in which a heating roll 20' is additionally provided on the upstream side of the aforesaid heating roll 20. In this illustration, guide rollers 21', 22', an arm 23' and a motor 24' placed in connection with this heating roll 20' are equivalent to the guide rollers 21, 22, the arm 23 and the motor 24 for the heating roll 20, respectively. That is, for the heating roll 20', there is provided a winding angle adjusting means comprising the guide rollers 21' and 22' and a guide roller moving means (the arm 23' and the motor 24'). As compared with the construction shown in FIG. 1, a heating means comprising the heating roll 20' and the winding angle adjusting means is provided additionally.

In this embodiment, for example, when both the winding angles of the back linerboard 11 with respect to the heating rolls 20 and 20' assume a minimum, the controller 61 first increases the winding angle with respect to the heating roll 20. In a case in which, although that winding angle reaches a maximum, the back linerboard 11 does not reach an optimum temperature, then the controller 61 increases the winding angle with respect to the heating roll 20'.

In addition, for example, when both the winding angles of the back linerboard 11 with respect to the heating rolls 20 and 20' assume a maximum, the controller 61 first decreases the winding angle with respect to the heating roll 20'. In a case in which, although that winding angle reaches a minimum, the back linerboard 11 does not show an optimum temperature, then the controller 61 decreases the winding angle with respect to the heating roll 20.

As a matter of course, it is also possible that, when both the winding angles of the back linerboard 11 with respect to the heating rolls 20 and 20' are at a minimum, the controller 61 first increases the winding angle with respect to the heating roll 20', and in a case in which, although this winding angle with respect to the heating roll 20' reaches a maximum, the back linerboard 11 does not show an optimum temperature, then the controller 61 increases the winding angle with respect to the heating roll 20. In addition, it is also possible that, when both the winding angles of the back linerboard 11 with respect to the heating rolls 20 and 20' are at a maximum, the controller 61 first decreases the winding angle with respect to the heating roll 20, and in a case in which, although this winding angle with respect to the heating roll 20 reaches a minimum, the back linerboard 11 does not show an optimum temperature, then the controller 61 decreases the winding angle with respect to the heating roll 20'.

This embodiment can provide an advantage of enlarging the temperature controlled range on the back linerboard 11.

Secondly, a description will be given hereinbelow of temperature control for the corrugated medium 12. The corrugated medium 12 are heated by the heating rolls 30 and 40 and the temperature of the corrugated medium 12 after heated is detected as a parameter, correlating with the moisture content of the corrugated medium 12, by the temperature sensor (moisture content detecting means) placed at a position immediately before the single facer 50.

A controller (control means) 63, as with the controller 61, is for controlling an operation of the winding angle adjusting means for the heating rolls 30 and 40 on the basis of the detection result of the temperature sensor 62, and includes a control element for performing feedback control, a control element for performing feedforward control and a control element for executing preset control. This controller 63 fetches the temperature detected by the temperature sensor 62 and maintains the temperature of the corrugated medium 12 before bonding at an appropriate temperature by implementing a temperature control procedure based on the procedure shown in FIG. 2.

The corrugated medium 12 temperature-adjusted in this way can excellently be bonded to the back linerboard 11 because of improvement of the adhesive property of the glue applied by the gluing device 56, and the occurrence of warp of the single faced bonded sheet material 10 is preventable.

Incidentally, the heating rolls 30 and 40 are made to alter the winding angles sequentially, as in the case of the heating rolls 20 and 20'.

That is, for example, when both the winding angles of the corrugated medium 12 to the heating rolls 30 and 40 are at a minimum, the winding angle to the heating roll 40 is first increased. Subsequently, if this winding angle reaches a maximum but the corrugated medium 12 does not show an optimum temperature, the winding angle to the heating roll 30 is also increased.

Moreover, for example, when both the winding angles of the corrugated medium 12 to the heating rolls 30 and 40 are at a maximum, the winding angle to the heating roll 30 is first decreased, and if this winding angle reaches a minimum but the corrugated medium 12 does not reach an optimum temperature, the winding angle to the heating roll 40 is then decreased.

Naturally, it is also possible that, when both the winding angles of the corrugated medium 12 to the heating rolls 30 and 40 are at a minimum, the winding angle to the heating roll 30 is first increased, and if, although the winding angle to the heating roll 30 reaches a maximum, the corrugated medium 12 does not show an optimum temperature, the winding angle to the heating roll 40 is then increased. In addition, it is also acceptable that, when both the winding angles of the corrugated medium 12 to the heating rolls 30 and 40 are at a maximum, the winding angle to the heating roll 40 is first decreased, and if, although the winding angle to the heating roll 40 reaches a minimum, the corrugated medium 12 does not have an optimum temperature, the winding angle to the heating roll 30 is then decreased.

Figure 5:
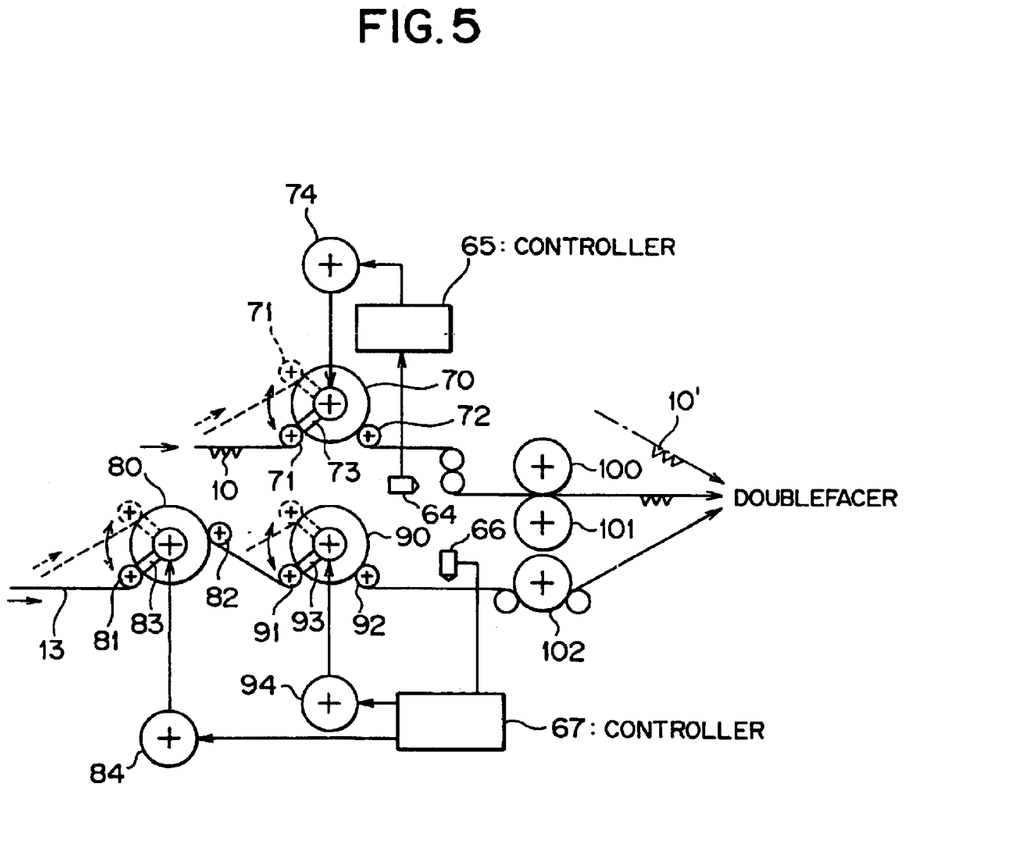
FIG. 5 schematically shows a construction of a heating element before a double facer section of a bonded sheet material manufacturing system according to the first embodiment of the invention.

In the meantime, the single faced bonded sheet material 10 formed in the single facer 50 shown in FIG. 1 or 2 is heated by a heating roll 70 shown in FIG. 5 and then fed, as a sheet member to be bonded, to a double facer (not shown). In addition, a front linerboard 13 to be supplied as a sheet member to be bonded to the double facer is heated by heating rolls 80 and 90.

Guide rollers 71, 72, an arm 73 and a motor 74 provided in connection with the heating roll 70 correspond to the guide rollers 21, 22, the arm 23 and the motor 24 for the heating roll 20, respectively. In addition, guide rollers 81 (91), 82 (92), an arm 83 (93) and a motor 84 (94) provided in connected with the heating roll 80 (90) also correspond to the guide rollers 21, 22, the arm 23 and the motor 24 for the heating roll 20.

That is, for the heating roll 70, there is provided a winding angle adjusting means comprising the guide rollers 71 and 72 and a guide roller moving means (the arm 73 and the motor 74). These heating roll 70 and winding angle adjusting means organize a heating means for the single faced bonded sheet material 10. Likewise, for the heating roll 80 (90), there is provided a winding angle adjusting means comprising the guide roller 81 (91), the guide roller 82 (92), the arm 83 (93) and the motor 84 (94). These heating roll 80 (90) and the winding angle adjusting means organize a heating means for the front linerboard 13.

The temperature of the single faced bonded sheet material 10 heated by the aforesaid heating roll 70 is detected as a parameter correlating with a moisture content of the single faced bonded sheet material 10 by a temperature sensor (moisture content detecting means) 64 located at a downstream position near the heating roll 70.

A controller 65 is for controlling an operation of the winding angle adjusting means (heating means) for the heating roll 70 on the basis of the detection result of the temperature sensor 64, and includes a control element for performing feedback control, a control element for implementing feedforward control and a control element for executing preset control. The controller 65 fetches the temperature detected by the temperature sensor 64, and implements a temperature control procedure based on the procedure shown in FIG. 2. As a result, the single faced bonded sheet material 10 before bonding is heated up to an appropriate temperature whereby bonding failure or the like in the double facer is preventable. The single faced bonded sheet material 10 temperature-adjusted in this way is conveyed through guide rollers 100 and 101 to the double facer.

On the other hand, the temperature of the front linerboard 13 heated by the aforesaid heating rolls 80 and 90 is detected as a parameter correlating with a moisture content of the front linerboard 13 by a temperature sensor (moisture content detecting means) 66 placed at a downstream position near the heating roll 90.

A controller 67 is for controlling an operation of the winding angle adjusting means (heating means) for each of the heating rolls 80 and 90, and includes a control element for performing feedback control, a control element for implementing feedforward control and a control element for executing preset control. This controller 67 takes in the temperature detected by the aforesaid temperature sensor 66, and implements a temperature control procedure based on the procedure shown in FIG. 2. In consequence, the front linerboard 13 before bonding is heated up to an appropriate temperature which can prevent bonding failure or the like in the double facer. The front linerboard 13 temperature-adjusted in this way is fed through a guide roller 102 to the double facer.

The aforesaid double facer conveys the aforesaid single faced bonded sheet material 10 and the front linerboard 13 in a laminated condition, and heats and presses the single faced bonded sheet material 10 and the front linerboard 13 to stick to each other during the conveyance. Each of the temperatures of the single faced bonded sheet material 10 and the front linerboard 13 is set appropriately under the aforesaid temperature control; therefore, the double faced bonded sheet material (double faced corrugated fiberboard) (not shown) formed by this bonding is released from bonding failure or warp and shows a high quality.

As with the procedure for the heating rolls 20 and 20' shown in FIG. 2, the aforesaid heating rolls 80 and 90 are made to alter the winding angle sequentially.

That is, for example, when both the winding angles of the front linerboard 13 to the heating rolls 80 and 90 are at a minimum, the winding angle to the heating roll 90 is first increased, and if this winding angle reaches a maximum but the front linerboard 13 does not reach an optimum temperature, the winding angle to the other heating roll 80 is then increased.

On the other hand, for example, when both the winding angles of the front linerboard 13 to the heating rolls 80 and 90 are at a maximum, the winding angle to the heating roll 80 is first decreased, and if this winding angle reaches a minimum but the front linerboard 13 does not reach an optimum temperature, the winding angle to the heating roll 90 is then decreased.

Naturally, it is also possible that, when both the winding angles of the front linerboard 13 to the heating rolls 80 and 90 are at a minimum, the winding angle to the heating roll 80 is first increased, and in a case in which, although this winding angle to the heating roll 80 reaches a maximum, the front linerboard 13 does not reach an optimum temperature, the winding angle to the heating roll 90 is then increased. In addition, it is also acceptable that, when both the winding angles of the front linerboard 13 to the heating rolls 80 and 90 are at a maximum, the winding angle to the heating roll 90 is first decreased, and in a case in which, although this winding angle to the heating roll 90 reaches a minimum, the front linerboard 13 does not reach an optimum temperature, the winding angle to the heating roll 80 is then decreased.

In this embodiment, a plurality of temperature sensors each equivalent to the aforesaid temperature sensor 64 (66) are located in a width direction (direction perpendicular to the paper surface of FIG. 5) of the single faced bonded sheet material 10, and the average value of the temperatures detected by these temperature sensors 64 (66) is used as an actually measured value of the sheet material 10 (front linerboard 13). As a matter of course, it is also acceptable that one sensor is shifted to scan it in the width direction for employing the time average value of the temperatures detected at this time as the aforesaid actually measured value.

Meanwhile, in a case in which the double facer situated on the downstream side of the guide rollers 100, 101 and 102 of FIG. 5 is of a type forming a triple-face bonded sheet material, in addition to the aforesaid single faced bonded sheet material 10 and front linerboard 13, a single faced bonded sheet material 10' (which is formed in a sheet material forming part similar to the single faced bonded sheet material forming part shown in FIG. 1) indicated by a chain line is fed to the double facer.

In such a system, a temperature control means similar to the temperature control means for the single faced sheet material 10 is employed, thereby adjusting the temperature of the single faced bonded sheet material 10' to an optimum temperature.

In each of the above-described embodiments, although a temperature sensor is used as the moisture content detecting means for detecting a parameter correlating with a moisture content of a sheet member such as the back linerboard 11 or the corrugated medium 12, it is also possible that a moisture sensor is employed as this moisture content detecting means to detect the moisture content directly. In this case, the aforesaid controllers 61, 63, 65 and 67 are designed to comparatively make a decision on a deviation in moisture in the step 205 of FIG. 2.

In addition, in each of the above-described embodiments, the winding angles of a sheet member to the heating rolls 23, 23', 30, 40, 70, 80 and 90 are changed to vary the heating quantity to the sheet member, it is also acceptable to employ another means for controlling the heating quantity.

Figure 6:
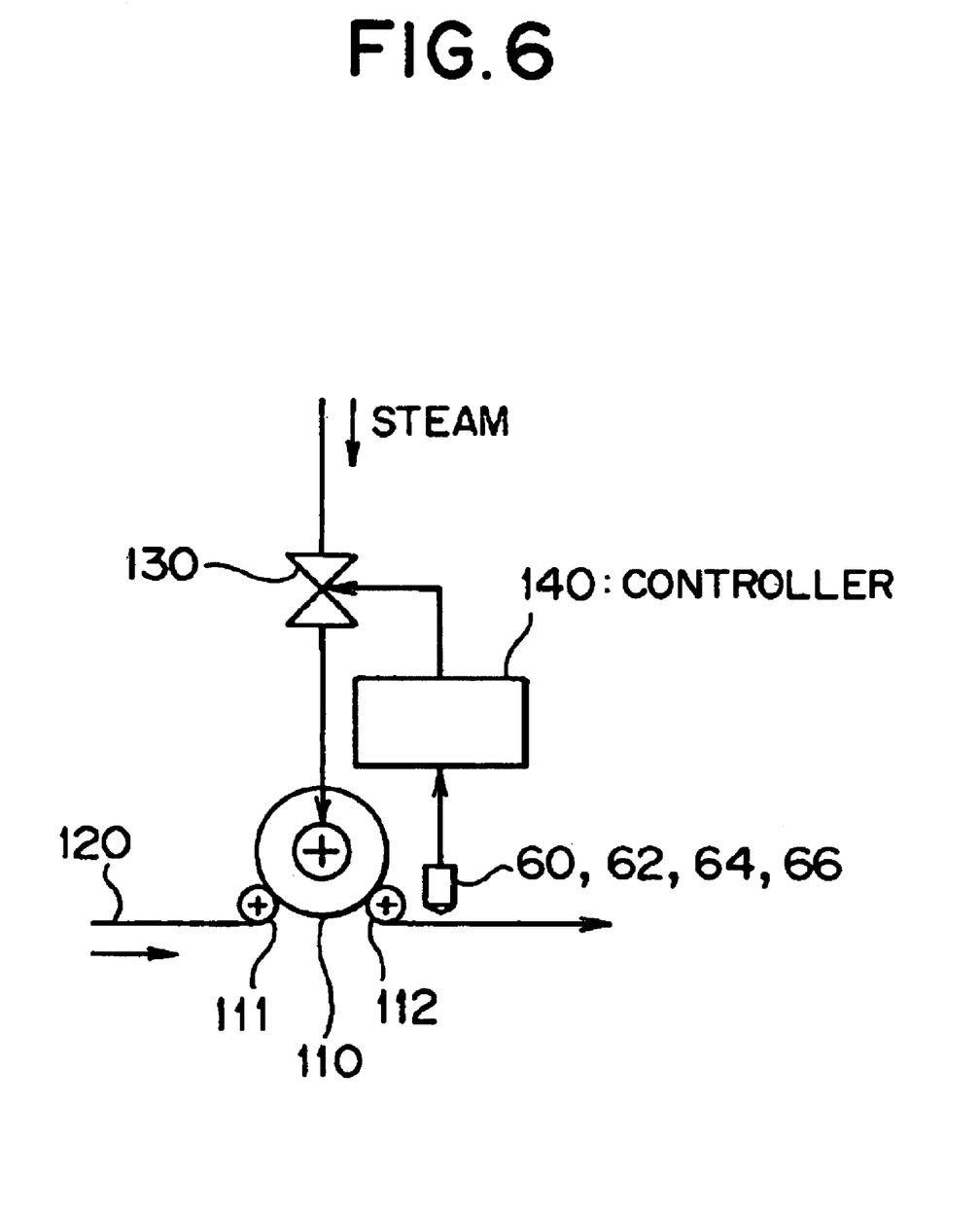
FIG. 6 is an illustration of a construction of the bonded sheet material manufacturing system according to the second embodiment of the invention, and schematically shows a construction of a heating element whereby a heating quantity of a heating roll is varied in accordance with control of steam pressure.

That is, for example, as FIG. 6 shows, if a heating roll 110 equipped with guide rollers 111 and 112 which cannot be shifted in position, i.e., a heating roll 110 which cannot change the winding angle of a sheet member 120, and a steam pressure adjusting valve (valve means) 130 placed in the middle of a passage for supplying heating steam to the heating roll 110 are provided to produce a heating means for the sheet member 120 and the steam pressure adjusting valve 130 is controlled in valve opening degree by a controller (control means) 140, then it is possible to vary the heating quantity to the sheet member 120 without altering the aforesaid winding angle. That is, a steam pressure (steam flow rate) to be supplied to the heating roll 110 is adjusted by a valve opening degree to adjust the steam supply quantity to the heating roll 110 for controlling the heating quantity.

Incidentally, naturally, the control in the embodiments described above with reference to FIGS. 1 to 5 are also applicable to the control in the embodiment shown in FIG. 6.

What is claimed is:

1. A system for manufacturing a bonded sheet material by bonding various types of sheet members together after separately heating said sheet members through the use of individual sheet member heating means, said system comprising:

bonding means for bonding said sheet members together;

moisture content detecting means provided for at least one of said sheet members for detecting a moisture content of said sheet member or a parameter correlating with said moisture content;

control means for controlling said sheet member heating means on the basis of detection information from said moisture content detecting means so that the moisture content approaches a predetermined optimum moisture content; and a decision means for making a decision as to whether a deviation between the optimum moisture content and a moisture content detected by said moisture content detecting means is equal to or below a predetermined value, said control means includes:

a first control element for feedback controlling said sheet member heating means when said decision means makes the decision that said deviation is equal to or below a predetermined value; and a second control element for feedforward controlling said sheet member heating means when said decision means makes the decision that said deviation is more than said predetermined value.

2. A system for manufacturing a bonded sheet material according to claim 1, wherein said sheet member is any one of back linerboard, a corrugated medium and a single faced bonded sheet material.

3. A system for manufacturing a bonded sheet material according to claim 1, wherein said sheet member heating means includes:

a heating roll for heating said sheet member in a state where said sheet member is wound around its circumferential surface; and winding angle adjusting means for adjusting a winding angle of said sheet member with respect to said heating roll, with said winding angle adjusting means being controlled by said control means.

4. A system for manufacturing a bonded sheet material according to claim 3, wherein said winding angle adjusting means includes a guide roll for bringing said sheet member into contact with said heating roll, and guide roll moving means for moving said guide roll on a circumferential surface of said heating roll.

5. A system for manufacturing a bonded sheet material according to claim 1, wherein said sheet member heating means includes a heating roll for heating said sheet member in a state where said sheet member is wound around its circumferential surface; and     valve means for adjusting a quantity of supply of heating steam to the interior of said heating roll, with said valve means being controlled by said control means.

6. A system for manufacturing a bonded sheet material according to claim 1, wherein said control means further includes a third control element for controlling said sheet member heating means to heat said sheet member to a preset temperature agreeing with an order change during the order change.

7. A system for manufacturing a bonded sheet material according to claim 1, wherein said control means further includes a fourth control element for, when a feed speed of said sheet member is lower than a predetermined speed, controlling said sheet member heating means to heat said sheet member to a preset temperature agreeing with the feed speed lower than said predetermined speed.

8. A system for manufacturing a bonded sheet material according to claim 1, wherein a plurality of said sheet member heating means are provided, and when a total heating quantity of said plurality of heating means reaches an excessive value, said control means decreases the heating quantities of said plurality of heating means successively starting from the upstream side heating means.

9. A system for manufacturing a bonded sheet material according to claim 1, wherein a plurality of said sheet member heating means are provided, and when a total heating quantity of said plurality of heating means does not reach a required value, said control means increases the heating quantities of said plurality of heating means successively starting from the downstream side heating means.

10. A system for manufacturing a bonded sheet material according to claim 1, wherein a temperature sensor is used as said moisture content detecting means.

11. A system for manufacturing a bonded sheet material according to claim 1, wherein a moisture sensor is used as said moisture content detecting means.

12. A system for manufacturing a bonded sheet material according to claim 1, further comprising:

scanning means for shifting said moisture content detecting means to scan said sheet member in a width direction of said sheet member; and     time-averaging means for time-averaging outputs of said moisture content detecting means when said scanning means scans said sheet member.

13. A system for manufacturing a bonded sheet material according to claim 1, wherein a plurality of said moisture content detecting means are located at a predetermined interval in a width direction of said sheet member, and width averaging means is further provided to average outputs of said plurality of moisture content detecting means.

14. A system for manufacturing a bonded sheet material according to claim 1, wherein said control means set said optimum moisture content on the basis of at least one of a sheet member feed speed, sheet member type and basic weight of said sheet member.

15. A system for manufacturing a bonded sheet material by bonding various types of sheet members together after separately heating said sheet members through the use of individual sheet member heater, said system comprising:

bonding device to bond said sheet members together, moisture content detector provided for at least one of said sheet members to detect a moisture content of said sheet member or a parameter correlating with said moisture content;

controller to control said sheet member heater on the basis of detection information from said moisture content detector so that the moisture content approaches a predetermined optimum moisture content; and     decision device to make a decision as to whether or not a deviation between the optimum moisture content and a moisture content detected by said moisture content detector is below a predetermined value,     said controller comprises:

first control element to feedback control said sheet member heater when said decision device makes the decision that said deviation is equal to or below a predetermined value; and         second control element to feedforward control said sheet member heater when said decision device makes the decision that said deviation is more than said predetermined value.

16. A system for manufacturing a bonded sheet material by bonding a first sheet member and a second sheet member together, said system comprising:

first sheet member heater to heat said first sheet member,     second sheet member heater to heat said second sheet member,     bonding device to bond said first sheet member and said second sheet member together after said sheet members are separately heated through the use of individual said sheet member heaters,     moisture content detector, which is disposed between one of said sheet member heaters and said bonding device, provided for at least one of said sheet members to detect a moisture content of said sheet member or a parameter correlating with said moisture content;

controller, which is communicably connected to moisture content detector and at least one of said sheet member heaters, to control said sheet member beater on the basis of detection information from said moisture content detector so that the moisture content approaches a predetermined optimum moisture content; and     said controller comprises:

decision element to make a decision as to whether or not a deviation between the optimum moisture content and a moisture content detected by said moisture content detector is below a predetermined value,         first control element to feedback control said sheet member heater when said decision element makes the decision that said deviation is equal to or below a predetermined value; and         second control element to feedforward control said sheet member heater when said decision element makes the decision that said deviation is more than said predetermined value.

* * * * *